United States Patent
Augst

(10) Patent No.: US 11,535,296 B2
(45) Date of Patent: Dec. 27, 2022

(54) DEVICE AND METHOD FOR OPERATING A VEHICLE WHICH CAN BE DRIVEN IN AN AUTOMATED MANNER COMPRISING A STEERING WHEEL WHICH CAN BE OPERATED BY THE DRIVER

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 180 days.

(21) Appl. No.: 16/965,692

(22) PCT Filed: Jan. 24, 2019

(86) PCT No.: PCT/EP2019/051730
§ 371 (c)(1),
(2) Date: Jul. 29, 2020

(87) PCT Pub. No.: WO2019/162033
PCT Pub. Date: Aug. 29, 2019

(65) Prior Publication Data
US 2020/0353980 A1 Nov. 12, 2020

(30) Foreign Application Priority Data

Feb. 23, 2018 (DE) .................... 10 2018 202 786.2

(51) Int. Cl.
*B62D 15/02* (2006.01)
*B62D 1/06* (2006.01)

(52) U.S. Cl.
CPC ............ *B62D 15/025* (2013.01); *B62D 1/06* (2013.01)

(58) Field of Classification Search
CPC ................................ B62D 1/06; B62D 15/025
See application file for complete search history.

(56) References Cited

U.S. PATENT DOCUMENTS

| 11,230,292 | B2 * | 1/2022 | Augst | G01C 21/3484 |
| 2008/0065293 | A1 | 3/2008 | Placke et al. | |
| 2012/0296528 | A1 | 11/2012 | Wellhoefer et al. | |
| 2014/0277896 | A1 * | 9/2014 | Lathrop | B62D 1/04 74/484 R |
| 2016/0091083 | A1 | 3/2016 | Drees et al. | |
| 2016/0200348 | A1 | 7/2016 | Lueke | |
| 2017/0137060 | A1 | 5/2017 | Wanner et al. | |
| 2018/0029640 | A1 * | 2/2018 | Otto | G05D 1/021 |
| 2018/0284798 | A1 * | 10/2018 | Kita | B62D 15/025 |
| 2019/0071113 | A1 * | 3/2019 | Board | B62D 1/14 |
| 2020/0223476 | A1 * | 7/2020 | Mate | B62D 1/22 |
| 2020/0307691 | A1 * | 10/2020 | Kalabic | B62D 15/025 |
| 2020/0317261 | A1 * | 10/2020 | Shoji | B60W 50/14 |

FOREIGN PATENT DOCUMENTS

| DE | 10 2009 022 055 A1 | 11/2010 |
| DE | 10 2011 076 174 A1 | 11/2012 |
| DE | 10 2013 010 630 A1 | 1/2015 |
| DE | 10 2013 216 931 A1 | 2/2015 |
| DE | 10 2014 207 969 A1 | 10/2015 |
| DE | 10 2014 107 194 A1 | 11/2015 |
| DE | 10 2016 009 709 A1 | 2/2017 |
| DE | 10 2015 118 531 A1 | 5/2017 |
| DE | 10 2015 224 244 A1 | 6/2017 |
| EP | 1 807 267 B1 | 8/2008 |
| WO | WO 2015/048959 A1 | 4/2015 |

OTHER PUBLICATIONS

International Search Report (PCT/ISA/210) issued in PCT Application No. PCT/EP2019/051730 dated May 21, 2019 with English translation (eight (8) pages).
German-language Written Opinion (PCT/ISA/237) issued in PCT Application No. PCT/EP2019/051730 dated May 21, 2019 (seven (7) pages).
German-language Search Report issued in German Application No. 10 2018 202 786.2 dated Sep. 4, 2018 with partial English translation (13 pages).
International Search Report (PCT/ISA/210) issued in PCT Application No. PCT/EP2019/051729 dated May 20, 2019 with English translation (eight (8) pages).
German-language Written Opinion (PCT/ISA/237) issued in PCT Application No. PCT/EP2019/051729 dated May 20, 2019 (six (6) pages).
German-language Search Report issued in German Application No. 10 2018 202 780.3 dated Aug. 29, 2018 with partial English translation (13 pages).

\* cited by examiner

*Primary Examiner* — Peter D Nolan
*Assistant Examiner* — Wae L Louie
(74) *Attorney, Agent, or Firm* — Crowell & Moring LLP

(57) ABSTRACT

A device is provided for operating a vehicle which can be driven in an at least partly automated manner, having a steering wheel which can be operated by a driver and which is also designed to carry out a substantially manual driving mode for controlling at least the lateral control of the vehicle. The device has at least one first operating mode which differs from a substantially manual operating mode in that one or more operations initiated by the driver in a first time interval at the steering wheel are not carried out in the first time interval, but instead are carried out in a second time interval in accordance with a predetermined condition.

18 Claims, No Drawings

DEVICE AND METHOD FOR OPERATING A VEHICLE WHICH CAN BE DRIVEN IN AN AUTOMATED MANNER COMPRISING A STEERING WHEEL WHICH CAN BE OPERATED BY THE DRIVER

BACKGROUND AND SUMMARY OF THE INVENTION

The invention relates to a device for operating a vehicle which can be driven in at least partially automated fashion, having a steering handle (as actuating element) which can be actuated by a driver, which device is also equipped to implement a substantially manual driving mode for the control of at least the lateral guidance of the vehicle.

In the German patent application with the file reference 102016217772.9, which does not constitute a prior publication, a device, an operating method and an electronic control unit for controlling a vehicle which can be driven in at least partially automated fashion are described, with which the operating method described in the present documents can advantageously be implemented. Therefore, in the present case, reference is made to the above-cited German patent application, which does not constitute a prior publication, in its entirety; in particular, the content thereof is to be fully incorporated by reference into the disclosure of the present invention.

In the present case, an intelligent interaction between a vehicle which drives or can be driven in automated fashion and a driver, who may also be a user of the vehicle (which may for example be driven in sufficiently automated fashion), is presented, which interaction provides the driver with a completely new possibility or a new driving experience (in relation to the hitherto known prior art) (=problem addressed by the invention).

The present invention solves this problem by providing a device for operating a vehicle which is drivable in at least partially automated fashion, having a steering handle which is actuatable by a driver, which device is also equipped to implement a substantially manual driving mode for control of at least the lateral guidance of the vehicle. The device has at least one first operating mode which differs from a substantially manual operating mode in that one or more actuating actions imparted by the driver at the steering handle in a first time interval are not implemented in the first time interval but, in a manner dependent on a predetermined condition, are implemented in a second time interval.

A device or steering handle according to the invention may, at least in a first time interval, be situated in a state in which it is at least partially decoupled from control of the lateral guidance of the vehicle, in particular from a (direct, substantial) influence on the wheel setting angle. The device may preferably also be configured to vary the at least one degree of the coupling between the steering handle and a (virtually immediate) influence on the wheel setting angle during operation, that is to say in particular during travel, in particular in at least two or more stages.

For example, the degree of the coupling may be settable under a certain threshold value in a manner dependent on a variable which represents the driving automation and/or in a manner dependent on an identified degree of the haptic contact of the driver with the steering handle and/or with a further actuating element. The actuating action of the driver can thus be implemented in a particularly comfortable and precise manner without thereby causing an initially undesired (in particular owing to it being premature) adjustment of the wheel setting angle.

Alternatively or in addition, a device according to the invention may be configured to select the degree of the coupling (that is to say the at least partial decoupling of the steering system) also in a manner dependent on an identified actuating action or on an identified intention of the driver to vary a (particular) actuating action, in particular in a manner adapted to the inputting of an actuating action. During the inputting of the actuating action, the steering handle exhibits a predefined behavior in relation to the hand of the driver, in particular a predefined haptic action (as an action or reaction to the actuating input). In this example, this is actively imparted by means of the activation of an actuator of the steering handle.

Preferably, the first operating mode differs from a fully automated and/or from a highly automated operating mode. The first operating mode is preferably an operating mode which, owing to its technical features and also with regard to its objectives, enables the driver to input a particular actuating action to influence the movement of the vehicle, in particular the lateral guidance of the vehicle. This may be performed in particular by means of the steering handle, which also serves for familiar manual steering of the vehicle in a substantially manual operating mode (for example also by means of a substantially familiar rotation of the steering handle). Here, in turn by contrast to the familiar manual operating mode, the driver does not have to make a precise selection of the point in time, for example for a turning maneuver. In particular, the driver (that is to say possibly a user) of a vehicle according to the invention (for example of a taxi or shared car) may be one who themself does not have sufficient driving knowledge or driving experience to be able to drive particularly well. Nevertheless, the device permits, during operation, a (respectively spontaneous, dynamically variable, intentional) specification for a movement of the vehicle. In particular, here, the second time interval does not have a fixed, original dependency relationship, defined for example during the development of the vehicle, for example "from the factory", in relation to the first time interval. Rather, the (respective) second time interval (which is to be selected for example for a particular position of the vehicle and/or particular driving situation) may be ascertainable or selectable during operation of the device during travel, or during the implementation of the operating method according to the invention during travel.

Preferably, the device is configured to, in the first operating mode, by contrast to a substantially manual mode, convert only certain features (selected in accordance with particular specifications) of the actuating action from the first time interval into the movement of the vehicle in the second time interval. Also, the device may be configured to, in the first operating mode, discard, correct or merely secondarily take into consideration certain further features (selected in accordance with particular specifications) of the actuating action, for example for the benefit of an increase in safety.

Preferably, the first operating mode also differs from a (possibly present) operating mode supported by means of one or more driver assistance systems. For example, an operating mode supported by means of a driver assistance system to the degree of automation 1 or 2 (known to a person skilled in the art) constitutes a substantially manual driving mode.

In the context of this document, the expression "first operating mode" may also be understood to mean a corresponding (new) operating mode. The first operating mode may (for example depending on the intended use of the vehicle, or in terms of at least one setting) differ from a standard operating mode provided for the vehicle, or may substantially replace highly automated driving (as it is described in the prior art). In particular, the "first operating mode" may be a "special operating mode". This may be activatable for example in the context of certain conditions, for example in the context of so-called shared cars, taxis etc.

Furthermore, the first operating mode may be activatable or deactivatable separately or preferably together with a variation of the vehicle settings, for example together with a so-called driving experience switch, with a variation of chassis settings etc. This gives rise to numerous advantages. The first operating mode may, but need not, be initiated by means of an abrupt transition. This may also be combined with one or more further operating modes of the vehicle and/or settable in stages or in substantially continuous fashion. Also, the first operating mode may for example be activatable or variable automatically in a manner dependent on a road type, position or state of the user.

If no manual mode is implementable in the vehicle, for example if the manual mode is deactivated (for example in the case of a taxi which can drive in highly automated fashion), the manual mode mentioned in the independent claim may serve merely as a comparison in relation to a corresponding (conceivable) manual mode. The presence or the activatability of an implementable manual driving mode in the vehicle is therefore not a prerequisite for the device according to the invention or for the corresponding operating method.

One or more further features of an actuating action performed by the driver in the operating mode according to the invention may in this case be discarded, taken into consideration in a predetermined manner or in particular interpreted. In particular, one or more features which contradict one or more features identified as decisive or which contradict a set criterion may be suitably interpreted. The driver of the vehicle may likewise be a user of a vehicle (which can be driven in highly automated fashion), for example a user of a taxi or of a shared car which can be driven in at least highly automated or at least approximately fully automated fashion.

Preferably, the implementation of the actuating action constitutes an influence on the movement of the vehicle in the case of which no permanent departure from a highly automated or a fully automated operating mode occurs. In particular, the device is configured to not depart from, or at least not permanently depart from, an operating mode which is presently controlling the movement of the vehicle, such as an at least highly automated operating mode, in the event of an actuating action being identified. For example, no "abandonment" of an automated mode or no permanent variation of the degree of automation occurs. For example, here, the variable representing the degree of driving automation which applied before the first time interval may again apply or be pursued, or continue to apply or be pursued, after the first time interval, in particular after the second time interval.

An actuating action referred to here is, in the context of the present document, in particular an actuating action which explicitly encompasses or implies a demand for particular lateral guidance of the vehicle or a variation of the lateral guidance of the vehicle, for example for a variation of a wheel setting angle of the vehicle. For example, the actuating action may encompass a demand for particular lateral guidance of the vehicle or a particular variation of the lateral guidance of the vehicle, in particular a particular variation or variation function of a wheel setting angle of the vehicle. This may also (as is in principle also the case with manual steering) predefine a certain specification for a (temporal or spatial) variation function of the lateral guidance.

Furthermore, the actuating action may be characteristic of a particular difference or deviation, for example desired, and expressed by means of the actuating action, at short notice during the driving operation of the vehicle, in relation to, for example, a planned route or a route or trajectory planned by a functionality of the vehicle.

The actuating action may be an action (performed with a greater or lesser degree of precision) by the driver for steering the vehicle. For example, the actuating action may be at least similar to an action performed by the driver in the case of a manually driven vehicle for the purposes of steering, for example when turning or for example during a lane change process. Here, however, a further difference in relation to manual steering may also consist in that such an actuating action can be performed by the driver, for example in a desired time interval, already before a turning point, for example before an intersection or exit. A further difference may also consist in that no involvement of the driver, or a particular, possibly very minor, involvement of the driver, is necessary during an implementation of the movement of the vehicle (which is to be performed in the second time interval).

An implementation, in the second time interval, of the actuating action performed in the first time interval may in turn be implementable only or substantially in accordance with particular features, for example selected in accordance with a predetermined guideline, of the actuating action from the first time interval. Furthermore, optionally, the actuating action may (also) explicitly encompass or imply longitudinal guidance, or a variation of longitudinal guidance, of the vehicle in a manner adapted in particular to demanded lateral guidance of the vehicle.

Furthermore, the implementation of the actuating action in the second time interval may, even if a demand for a variation of the longitudinal guidance of the vehicle is explicitly or implicitly identified in the actuating action, include a particular implementation, which is for example expedient owing to predetermined criteria, of a variation of the longitudinal guidance of the vehicle. The implementation of a variation of the longitudinal guidance of the vehicle may in this case occur in an overlapping manner in terms of time with, shortly before, or shortly after, the variation of the lateral guidance of the vehicle.

In general, or preferably, the vehicle furthermore comprises a controller unit which is configured to, in a manner dependent on an actuating action of the driver at the actuating element and/or on an electronic control unit which controls at least the automated lateral guidance of the vehicle (and/or a longitudinal guidance of the vehicle), control or set a steer angle, in particular a particular wheel setting angle variation, at the steerable wheels of the vehicle. In particular, the controller unit is configured to have one or more features of the device and/or to implement one or more corresponding method steps of the operating method. For example, such a controller unit may for example be installed together with an electric servo steering system and/or together with a control unit which controls or triggers the at least partially automated or remote-controlled driving.

The second time interval may be selectable in a manner dependent on at least one predetermined condition. The at least one predetermined condition may be ascertained and taken into consideration in a manner dependent on a present driving situation and/or a driving situation which is predicted for the near future. The at least one predetermined condition may in this case have a particular first selection of the features, in particular a particular first pattern of the driving situation, and/or may have a particular second selection of the features that must apply to the driving situation during the operation of the device, in particular a second pattern of the traffic situation.

As regards the driving situation mentioned immediately above, the second time interval for the implementation of an influence on the movement of the vehicle may be plannable in a manner dependent on the at least one predetermined condition. Here, the device may be configured to, for example already during or shortly after the identification of the actuating action, ascertain a second time interval, or a driving distance or position corresponding to the second time interval, at which the corresponding influence on the movement of the vehicle should be implemented or can be implemented. The device may plan an implementation of the movement of the vehicle and/or initiate particular preparatory measures for this. As an example of a preparatory measure, external signaling on the vehicle, for example a turn signal, may be performed.

Discussing briefly the expressions "driving situation" and "traffic situation", the driving situation is preferably characterized by the following features or parameters:

- a (particular) spatial distribution and/or movement parameter of the traffic participants, in particular a distribution pattern of the traffic participants, in the surroundings of the vehicle,
- a (particular) spatial distribution of immobile objects in the surroundings of the vehicle,
- relative position and/or movement parameters relating to particular types of lane markings, traffic signs, traffic signals (not necessarily relating to particular traffic signals, etc.),
- an item of information relating to the forward travel of the ego vehicle, in particular in relation to particular traffic participants and/or traffic participants actually or at least potentially approaching from particular directions, for example from the right or the left on a crossing street.

Preferably, the first driving situation and/or second driving situation may be a driving situation which overshoots particular threshold values or a driving situation which is characterized by parameters which overshoot particular threshold values. For example, the first driving situation and/or second driving situation may be a driving situation which comprises an undesired or hazardous approach to an object or to a traffic participant, an acceleration value which overshoots a threshold value, an undesired arrangement in relation to further traffic participants, etc. The first driving situation and/or second driving situation may be a (seldom occurring) special situation or a hazardous driving situation, for example a driving situation for which an increased risk is ascertained or assumed.

For example, the device according to the invention may be configured to implement, or read in for example from further devices, a classification of a present driving situation applicable for the at least one first time interval and/or for a second time interval and/or for the time after the second time interval. Here, an assignment of a first driving situation to one of several predefined classes may be determined. Such a classification may be performed within the respective first vehicles and/or in the remote processing unit.

A driving situation is particularly preferably characterized and/or ascertained on the basis and/or in the form of a pattern, for example of a recognition pattern, wherein the pattern of the driving situation is determined by particular mathematical relationships of the at least two different underlying variables. For example, one pattern is characterized by the respective ego vehicle having for example a speed at least twice that of another traffic participant, for example a crossing vehicle with or without right of way, an overtaking vehicle, etc. Here, a first pattern of the driving situation may be predefined, which then applies for example for a multiplicity of particular absolute values, for example speed values.

In a simplified case, the first driving situation may be a driving situation which is characterized by particular criteria, for example overshooting and/or undershooting of predetermined threshold values. For example, the device may be configured to, in the case of particular, for example as a result of particular, ones of the stated features, combinations of features or the patterns of the driving situation:

- implement the identified actuating action immediately, for example already in the first time interval,
- freely select a second time interval, wherein this is no later than for example 5, 10, 20, 30, 60 seconds after the first time interval,
- significantly vary, or reject, the implementation of the variation of the movement of the vehicle in relation to the demand identified from the actuating action,
- output an item of information to the driver.

In particular, the expression "driving situation" defined here relates to a driving situation relating to the surroundings of the vehicle of <10, 30, 50, 100, 150 meters. The features of the driving situation may be ascertained by means of a sensor system of the vehicle or from a direct detection of the surroundings. The advantage is thus achieved that features that are typical for the implementation of drivers' tasks (in the case of manual driving) can also be taken into consideration. In particular, the meaning of the expression "driving situation" differs from a colloquial meaning of the expression "traffic situation".

Alternatively or in addition, the device may be configured to determine or adapt the second time interval also in a manner dependent on a traffic situation. Here, an identifier of the traffic situation may be able to be read out from data of a navigation system. In a simplified case, such an identifier may for example correspond to particular categories "free traffic", "dense traffic", "slow-moving traffic", "traffic jam" etc.

The second time interval can be selected in a manner dependent on the level of the haptic contact with at least one part of the actuating element. The haptic contact, in particular the level of the haptic contact, in this case in particular does not encompass any movement or action of force which (at least considered overall) is directed in the direction of the actuating action, for example in a direction of rotation of the steering wheel. In one example, a particular "grip type" or one or more particular grip patterns on the actuating element can be identified as a specification of at least a lateral guidance of the vehicle (for example a steering wheel of the vehicle), and, in a manner dependent on the identification of the particular "grip type" or of one or more particular grip patterns, can be identified by the device as a desired specification by the driver, that is to say actuating action.

Here, respectively required haptic contact and the at least one actuating action may (also simultaneously) be performed "immediately" by the user using one hand or using both hands. The stated levels, which are distinguishable (at least from one another) by the device, of the haptic contact may in this case also be selected such that they correspond to particular predominantly instinctive and/or predominantly intentional impulses of a person. Here, the features described in this document may also be varied depending on whether a level of the haptic contact has been identified as characteristic of a predominantly instinctive impulse and/or as characteristic of a predominantly intentional impulse. For example, in the case of a relatively low level of the haptic contact, a relatively large difference, or a third time interval between the first time interval and the second time interval, may be selectable, in particular for the benefit of a feature of driving quality, of energy efficiency and/or of driving safety. In the case of a relatively low level of the haptic contact, it is possible for a feature of the driving quality, of the energy efficiency and/or of the driving safety pursued for example by the automated control of the vehicle to be taken into consideration to a lesser degree, for example with a lower, reduced weighting, for the benefit of an immediate implementation or of a (where possible) reduced difference or a third time interval between the first time interval and the second time interval.

The device may be designed to select a second time interval which differs significantly from the first time interval if the level of the haptic contact is below a first threshold value and/or is decreasing, and/or to select a second time interval which overlaps at least partially with the first time interval, or which is not significantly later than the first time interval, if the level of the haptic contact is above a second threshold value and/or is increasing. Thus, during operation, it is possible to achieve an effect which is imaginable approximately as an effect during the riding of a riding animal, for example of a horse. This can be explained for example on the basis of the following metaphor: if the rider holds the "reins" loose or leaves them loose, the horse has a certain amount of freedom to select a suitable point in time for implementing the identified demand of the rider (if such a desire is present). If the rider holds the "reins" tightly, or noticeably tightens them or (depending on riding school) performs a certain action with them, the horse should immediately obey or should not unnecessarily delay in implementing the demand of the rider.

In this context, a major concept of the present invention can also be presented in other words. Specifically, as follows: a driver is driving in their vehicle in a highly automated or automated operating mode. Then, the driver sees something of interest to them for example in a particular direction outside the predefined route. It is now the intention to enable the driver to use their steering handle, that is to say for example their steering wheel, to transmit to the autonomously driving vehicle the demand for the route to be modified toward the destination of interest to the driver. For this purpose, the driver rotates the steering handle to the right or to the left, specifically even before the vehicle is situated at a suitable road turn-off. It is also not necessary for the driver to specify the exactly matching rotation, and the driver may specify this for example several seconds before the desired turn. The steering wheel can thus be rotated without the vehicle immediately turning. Here, during this time, its steering wheel is in a predominantly decoupled state. That is to say, the steering handle can be steered at least within certain limits (for example position limits) without the vehicle prematurely steering, for example turning before the intersection. The device according to the invention however identifies the driver demand, for example to turn to the right or to the left, or to change to an adjacent driving lane. The demand is then automatically implemented as soon as the corresponding point of the road has been reached and/or the boundary conditions are sufficiently suitable. That is to say, the user can make their demand known by means of the steering wheel a greater or lesser amount of time in advance, as desired, without being involved further in the control of the vehicle.

At least one predetermined condition is ascertained and taken into consideration in a manner dependent on an item of map information. For example, an item of position information of a present or predicted position of the vehicle or an at least probable route of the vehicle, in particular an MPR (Most Probable Route), can be ascertained. Furthermore, it is possible for a portion of the layer of a digital map to be read in in a manner dependent on a present or (with a certain probability) predicted future position of the vehicle. The check of the at least one predetermined condition (in a simplified case, the fulfilment or non-fulfilment of the at least one predetermined condition) may thereupon be ascertained in a manner dependent on the ascertained item of position information or route of the vehicle and the read-in data from the map (or the item of map information). As a result, it is for example possible for the implementation of the at least one movement, in particular a variation of the lateral guidance of the vehicle with regard to one or more features or parameters of the movement and/or with regard to the second time interval, to be performed in a second time interval in a manner dependent on the item of map information.

The first operating mode can be activated in a manner dependent on a variable which represents the degree of driving automation, in particular in a predetermined range of the variable which represents the degree of driving automation. The first operating mode is particularly preferably activatable in a manner dependent on a variable which represents the degree of driving automation, in particular in a predetermined range of the variable which represents the degree of driving automation. Here, it is possible for one or more additional operating modes to be provided which differ for example with regard to their parameters. For example, at least before the implementation of the further sequence described in this document, it may be checked whether a sufficient degree of automation will be available in the second time interval. For example, the device is configured to adopt at least two of the first additional operating modes, wherein, for at least two variables which represent the respective degree of driving automation and/or in a manner dependent on settings or on a selection by the user, at least two different first operating modes can be selected.

As regards the stated degree of automation, it is preferable for a variable which represents the present degree of driving automation of the vehicle and a variable which represents the predicted degree of driving automation of the vehicle to be taken into consideration for at least one time interval lying ahead, in particular for a particular time interval or driving route. The variable which represents the degree of automation may, in the context of this description, be a present degree of automation or a degree of automation, or the corresponding variable, determined for the near future (1-30 seconds).

For example, the variable which represents the degree of automation may be assumed to be high if the degree of automation is increasing and has overshot a particular level and/or may be assumed to be low if it is decreasing and has undershot a predetermined level. It is particularly preferably possible for a level of the degree of automation accumulated over time to be taken into consideration.

Preferably, the device according to the invention is designed to ascertain a variable, which represents the (implementable) degree of automation, of the vehicle for the present degree of automation, which is applicable in particular in the time interval of +/−2 seconds, and/or for the, for example predicted or desired, degree of automation which will be applicable in the near future of approximately 1-30 seconds. In particular, the device may be configured to ascertain, in particular read in, a level of the degree of automation from further devices within or outside the vehicle.

For example, the first operating mode is activatable during driving operation, for example in a particular driving situation, only or at least predominantly if a variable which represents the implementable degree of driving automation overshoots a predetermined threshold. Furthermore, the device may be configured to terminate the first operating mode, vary the features of the first operating mode and in particular output a corresponding item of information to the driver if, during the implementation of the first operating mode, in particular after the first time interval, the variable which represents the (implementable) degree of automation undershoots a predetermined threshold and/or is decreasing, for example has a strongly decreasing tendency.

For example, the device is configured to, in the event of an identification, in particular prediction, of highly automated driving which can be implemented at least on certain routes or of fully automated driving, ensure the features described in this document and take them into consideration as a criterion for the implementation of the first operating mode. In particular, the device is designed not to have the features described in this document, or to have them only in a modified form, if no identification, in particular prediction, of highly automated driving which can be implemented at least on certain routes or of fully automated driving or an identification of a different degree of automation occurs. The identification, in particular prediction, of the corresponding variable which represents the degree of automation may relate to the time interval in which the at least one actuating action was identified and/or to a time interval in which the corresponding influencing of the movement of the vehicle, in particular of the lateral guidance, can be implemented.

The at least one first operating mode may be initiable, deactivatable or variable in a manner dependent on the level of the haptic contact of the driver of the vehicle with a grip surface of the actuating element or of the steering handle. Thus, a device according to the invention can be configured to, in a manner dependent on the level of the haptic contact:
  initiate, deactivate and/or vary the first operating mode. This occurs for example if the level of the haptic contact overshoots a particular threshold value, and/or
  implement the action within the first operating mode in particular with regard to particular driving situations. This includes for example the described selection or adaptation of the second time interval in relation to a particular identified actuating action.

In other words, one or more particular "grip patterns" may be provided, with which the at least one first operating mode can be initiated, deactivated or varied in particular in a particular manner. Furthermore, a transition between at least two variants of the first operating mode may be implementable in a manner dependent on a variation of the level of the haptic contact. For example, one or more particular levels of the haptic contact may be provided in the case of which a state transition, for example into a first operating mode and/or out of a first operating mode, in particular to a particular further operating mode and/or between at least two different first additional operating modes, is initiated. Alternatively or in addition, one or more levels of the haptic contact may be provided which do not give rise to a permanent transition in state but which are valid for:

an actuating action performed in the present time interval,
  an actuating action performed in a subsequent time interval,
  an actuating action that has already been at least substantially performed.

For example, upon the identification of the at least one particular level of haptic contact, a brief transition into a first operating mode and/or out of a first operating mode, in particular to a particular further operating mode, may be initiated. Here, an automatic departure from the at least one first operating mode, in particular back into a previous operating mode or into the most recent previous operating mode, may occur after an identification of a (substantially or completely) input actuating action and/or after a particular time interval has elapsed or a particular distance has been covered.

The degree of the interpretation of at least one actuating action imparted by the driver in a first time interval may be variable in at least two stages or in continuous or quasi-continuous fashion in a manner dependent on the level of the haptic contact. It is thus possible for the parameters of the at least one first operating mode to be variable in a manner dependent on the level of contact of the driver of the vehicle with one or more grip surfaces, in particular also within the first operating mode. For example, the taking into consideration of particular features of a subsequent actuating action, for example a direction of the movement, an amplitude or angle range of the movement, speed of the lateral movement or a time horizon with which lateral guidance follows the actuating action (depending on boundary conditions), may be varied.

The level of the haptic contact between the driver and the actuating element may comprise a pattern of the haptic contact on the basis of the pressure exerted on the actuating element by at least one hand, in particular one or more fingers, of the driver. The level of the haptic contact between the driver and the actuating element may comprise a pattern of the haptic contact on the basis of an areal pattern of capacitively detected measured values. A degree of the coupling of at least a second part of the actuating element to a fixed position in the coordinate system of the vehicle may be controlled or definable, wherein the second part differs from the first part of the actuating element or of the steering handle. The at least one influence on at least the lateral guidance of the vehicle in the second time interval, which is dependent on the actuating action of the driver in the first time interval, may be dependent on one or more parameters of the driver.

With the above-stated features, the parameters of the driver may be characteristic of:
  a state of attentiveness, a viewing direction, a view accommodation of the driver, and/or
  a state of the driver, in particular a state of alertness, a state of sleep,
  blink detection, a state of microsleep of the driver.

Here, the parameters may relate to the at least one first time interval and/or the second time interval. In one example, the implementation of the movement of the vehicle is performed in a second time interval only or predominantly if the parameters then satisfy a predetermined criterion. For example, the driver may initiate a turn of the vehicle by means of a steering handle already several seconds or approximately 30, 50, 10 meters before a turning possibility. When the turning possibility is reached, the turn is implemented only if the latter parameters satisfy a predetermined criterion before and/or during the turn. For example, the driver must at least briefly look in the direction of the turn.

In the case of a device according to the invention, a variation of the degree of the interpretation of the one or more control actions imparted by the driver in a first time interval, and/or of the coupling of the actuating element or of a part thereof, may be dependent on an action, which overshoots a predetermined level, by the driver on another actuating unit for the control of the vehicle. A takeover desire and/or a steering capability of the driver with regard to a driving task may be identified by the device, and the degree of the interpretation of the one or more control actions imparted by the driver in a first time interval, and/or of the coupling of at least one part of the actuating element, may be controlled by the device according to the invention in a manner dependent on the identified level of the takeover desire and/or of the takeover capability. A device according to the invention may be designed to ascertain a presently executed automatic maneuver or predicted at least partially performed maneuver, and to thereupon apply different levels of the haptic contact as prerequisite for a variation of the degree of the interpretation of the one or more actuating actions imparted by the driver in a first time interval and/or of the coupling. Provision may be made whereby the device can output at least one item of haptic information to at least one part of the actuating element, which item of haptic information signals or confirms a receipt or a taking into consideration of an actuating action imparted by the driver in the first time interval.

An operating method serves for operating a vehicle which can be driven in at least partially automated fashion, having a steering handle which can be actuated by a driver of the vehicle and which, in a substantially manual operating mode, serves for the control at least of the lateral guidance of the vehicle, wherein at least one first operating mode can be initiated or implemented, wherein, in the first operating mode, the steering handle is at least partially decoupled from an influence on the lateral guidance of the vehicle, and wherein an actuating action by the driver in a first time interval can be identified, which actuating action characterizes a specification for a variation at least of the lateral guidance of the vehicle, and wherein, in a second time interval, at least one movement of the vehicle is implemented as a consequence of the identified actuating action, wherein the second time interval does not coincide with the first time interval.

In particular, the device according to the invention is configured to implement the operating method, or the operating method according to the invention can be implemented by means of the device.

Furthermore, a corresponding electronic control unit and a corresponding computer program are claimed. Here, the electronic control unit may for example also be configured as part of a central computer, which is in particular arranged remote from the vehicle, for example of a backend, wherein a data connection to the vehicle can be established for the operation of the device or for the implementation of the operating method.

Further statements or explanations relating to the present invention, which can also be regarded as exemplary embodiments, follow below. Here, below, it is also stated that a device according to the invention is configured in a particular way, though this does not mean that such a configuration is obligatory; rather, optional features are also specified in this manner below.

DETAILED DESCRIPTION OF PREFERRED EMBODIMENTS

A device according to the invention may be configured for (at least initially) setting the steering system of the vehicle into an at least partially decoupled state—in this regard, cf. explicitly the German patent application with the file reference 102016217772.9, which does not constitute a prior publication and to the entire content of which reference is made here. In particular, the content thereof is fully incorporated by reference into the disclosure of the present invention.

For example, the degree of coupling is reduced in a manner dependent on particular criteria. The degree of the coupling may be configured to be variable in a manner dependent on the present or attainable degree of automation. Alternatively or in addition, the degree of the coupling may also be configured to be variable in a manner dependent on the ascertained degree of the haptic contact. For example, the setting of the steering system of the vehicle into an at least partially decoupled state, in particular with a degree of the coupling below a certain threshold value, may be configured in a manner dependent on a variable representing the driving automation and/or on an identified degree of the haptic contact of the driver with the steering handle and/or with a further actuating element. In this example, the at least partial decoupling of the steering system may also be performed in a manner dependent on an identified actuating action or on an identified intention of the driver to perform a (particular) actuating action. In particular, one or more position limits, angle limits and/or a haptic parameter of the steering handle may be settable or variable in a manner dependent on the features described in this document. It is also possible for a mechanical, mechatronic or logical transfer function between the steering handle and at least one actuator which serves for the setting or control of the lateral guidance of the vehicle to be settable or variable in a manner dependent on the features described in this document.

During the inputting of the actuating action, the steering handle exhibits a predefined behavior, in particular a predefined haptic action (as an action or reaction to the actuating input), in relation to the hand of the driver. In this example, this is actively initiated by means of the activation of an actuator of the steering handle.

Below, discussing the haptic contact, it is preferably the case that, for the level of the haptic contact, multiple and primarily, in principle, different extents of the haptic contact are ascertained and taken into consideration, for example whether the steering handle is being held and/or gripped using only one hand or using both hands. The respective manifestation of the haptic contact may however also consist in the locations of the steering handle at which the haptic contact exists and in particular may also be dependent on the force or intensity with which the haptic contact is present.

For example, the level of the haptic contact may be dependent on
- a dimension of the contact area, in particular between the hand (hand area) of the driver and the steering handle of the vehicle; and/or
- a pressure, in particular in the form of the entire contact pressure and/or pressure distribution and/or in the form of the pressure per unit of contact area and/or in the form of a pressure per regions of the hand area which (in a relevant time interval) are in haptic contact or are predicted to be in haptic contact with the steering handle; and/or
- the tautness and/or position of one or more fingers of the driver.

Here, it is preferably possible for particular predefined regions of the steering handle, which (during the steering of a vehicle in one or more different operating modes) are intended to be in haptic contact, or be in haptic contact at a predefined level, with the hand of the user, to be taken into consideration.

For example, the pressure distribution or a pressure distribution pattern on the steering handle may be a preferred measure of the manifestation of the haptic contact. Here, the steering handle may, in the case of a steering wheel, be substantially the steering wheel ring. However, in the context of this document, the expression "steering handle" may also be understood to mean a further, not necessarily circular, actuating element which serves for the control at least of the lateral guidance of the vehicle. Also, the vehicle may be a vehicle which is driveable in virtually fully automated fashion (in a manner dependent on predetermined conditions), wherein the steering handle may then possibly be designed to be extendable and fixable.

The level of the haptic contact may in this case be detected by means of a preferably expediently configured sensor or steering wheel sensor. A steering wheel sensor may be a sensor which is installed in a part of the steering wheel, for example an expediently refined "hands-on sensor", or a "hands-off sensor". At a device according to the invention, the manifestation of the haptic contact may be an extent and/or a pattern with regard to pressure or electrical capacitance or inductance of the haptic contact between at least one hand of the driver and the steering wheel (or at least one part of the steering wheel). Here, the extent may be locally limited, that is to say for example may be of importance only over certain partial areas of the steering wheel, and accordingly ascertained only there, and/or the pattern may be an areal pattern. The latter exemplary patterns may be for example an areal pattern and/or a temporal pattern, specifically for example with regard to the applied pressure which is exerted on the steering wheel by one hand and/or two hands of the driver. Such patterns or pressure patterns may be ascertained for example by means of a capacitive or piezoelectric sensor in the steering handle, for example with the aid of a suitable refinement of a hands-on sensor such as is known per se. This may be capable of also detecting, and in particular identifying and classifying, at least two-dimensional patterns. Here, it is also possible for an identification of (individual) fingers to be performed. Preferably, it is also possible for the position or setting of the fingers in relation to the parts of the steering wheel to be ascertained and taken into consideration. It is preferably also possible for the variation (for example a variation of the level of the haptic contact) to be detected and taken into consideration.

The detection of the two-dimensional pattern may in this case be performed by means of a sensor mat installed into the steering handle, for example into the steering wheel ring. Here, the device may also be configured for implementing an at least two-dimensional pattern recognition method, which may for example use the methods of image processing that are known per se. Here, the at least two-dimensional pattern recognition method may be applied to a part of the surface of the steering wheel ring, in such a way that the surface is mapped onto a two-dimensional area. Preferably, the level of the haptic contact is configured by means of a three-dimensional pattern recognition method, wherein at least one dimension represents a profile with respect to time. As a result, it is for example possible to distinguish between 4-16 different levels of the haptic contact, for example in accordance with the patterns identified in the method.

A level of the haptic contact between the driver of the vehicle and the steering wheel may thus encompass a temporal and/or areal pattern of capacitively detected measured values, which are generated by one hand and/or two hands of the driver on the steering handle of the vehicle. An implementation of an inductive sensing principle is self-evidently alternatively or additionally also possible. In addition or alternatively, a camera system (image capture system) provided in the interior compartment of the vehicle may be utilized to detect the level of the haptic contact between the hands of the driver and the steering wheel (or at least one part of the actuating element for vehicle lateral guidance), for example by means of optical object identification. Such a method-related feature is in this case the identification of the manifestation or of the level of haptic contact between the driver and the steering wheel (or the like) and possibly of a suitable reaction to this.

The level of the haptic contact can thus be described or represented by a measure of a capacitive and/or inductive value between the steering handle and the driver (one or two hand areas of the driver). Thus, the level of the capacitive contact and/or inductive contact may be detected for example by means of a capacitive sensor integrated in the steering handle and/or by means of a steering wheel heating wire. Alternatively or in addition, the (physical) pressure or the pressure distribution of the hand (or hand areas) of the driver on the (manual) actuating element for the lateral guidance of the vehicle may be detected. The identification of the haptic contact may in fact then be dependent on one or more pressure values and/or capacitance values or on a change of the pressure values and/or capacitance values which are caused by one or two hands of the driver on the steering handle of the vehicle. Preferably, the haptic contact is represented by one or more particular levels. Here, a distinction may be made between light contact (virtually without force) on the steering handle (for example on the steering wheel ring) by one hand or by two hands and gripping the steering wheel with one or two hands of the driver and a pronounced force coupling between the one or two hands of the driver and the steering handle. The latter may be represented by close and/or areal contact or a corresponding level of the friction force.

According to a further aspect, the invention is characterized by a computer program, wherein the computer program is configured to operate the device in accordance with one or more of the features described in this document and/or to implement the operating method in accordance with one or more features described in this document. In particular, the computer program is a software program which can be executed for example in the form of an app ("application") for one or more types of electronic processing units, preferably on the electronic controller unit. Preferably, the computer program is also configured to take into consideration and aggregate a multiplicity of further information items for operating the device and/or for the implementation of the operating method.

According to a further aspect, the invention is characterized by a computer program product which comprises executable program code and/or data segments, wherein the program code and/or data segments are configured for enabling the electronic unit to implement the operating method in accordance with one or more features of the device or of the method. The computer program product comprises in particular a medium which can be read by the data processing device, or memory areas on a medium or in a backend or cloud on which the program code and/or data segments are stored. According to a further aspect, the invention is characterized by a product which comprises a permanent or restricted authorized right of access to stored data of the computer program product. The computer program product may in this case be in the form of an update to a previous computer program, which, for example in the context of a functional expansion, for example as part of a so-called "remote software update", comprises the parts of the computer program or of the corresponding program code.

The vehicle in the context of this document is preferably a motor vehicle. This gives rise to multiple advantages which are explicitly described in the context of this document and multiple further advantages which are understandable to a person skilled in the art. Nevertheless, the vehicle may also be an amphibious vehicle, a flying vehicle, a watercraft or an agricultural machine.

A particularly great advantage of the invention arises in the case of application to a number of the vehicles selected in accordance with predetermined criteria, for example associated with one or more, for example cooperating brands or members of an organization, of a group of users, of a group of a social network, and so on. Here, the device may also be configured for an expedient exchange of information items on the basis of the data of other vehicles from the number of vehicles. The operating method may therefore also comprise access to the program code and/or data segments, for example for a group of vehicles and/or the users, in unrestricted or restricted form, for example in a form restricted to particular applications or conditions. Furthermore, the invention also comprises a system comprising a number of first vehicles and a number of second vehicles and/or a remote processing unit, for example a backend, for the operation of the vehicles. Furthermore, the invention also encompasses all further functionalities which are utilizable in the vehicle or functionalities of the vehicle which are in turn expediently operable on the basis of the features of the device or in a manner dependent on the information items ascertained in the operating method.

Below, in the context of a further example, the degree of automation will be discussed. The measures or category values defined by the VDA (Verband Deutscher Automobilindustrie—German Automobile Industry Association) will be considered in this example as the variables which represent the degree of automation.

Furthermore, a part of the invention comprises that the variable which represents the degree of automation takes particular aspects of the attainable or suitable degree of automation into consideration individually, selectively or in particular combinations. For example, one driving variable which represents the degree of automation may also be selective, with regard to at least two different aspects of the automation of the movement of the vehicle and/or for two or more different driver assistance functions of the vehicle in the control unit, for example with regard to longitudinal guidance of the vehicle and/or lateral guidance of the vehicle and/or implementation of a lane change and/or implementation of an overtaking maneuver and/or information items relating to the driver, in particular in conjunction with the control of the vehicle. All of the described features of the invention may in this case be applied separately and differently for different aspects of the automation.

The device is configured to read in, or preferably ascertain on the basis of various data, a variable which represents the degree of automation. In this example, the at least one variable which represents the degree of automation may be ascertained and/or taken into consideration in a manner dependent on the specifications by the driver and/or on a stored actuating history of the driver and/or on parameters or further expedient criteria (for example road type etc.) which are stored in a backend and which can be accessed by the vehicle.

One or more features of the method, for example various threshold values, boundary conditions relating to an interpretation of an actuating action by the user, etc., may be operable in a manner dependent on a category of the variable which represents the present or predicted degree of driving automation of the vehicle (for example, the vehicle is operated in the partially automated driving mode if one or more of the variables lie above a certain value and/or below a certain value), in particular in a manner corresponding to at least one feature of the invention.

In a simplified example, the stages of the degree of automation that are known from the prior art may be taken into consideration. For example, the stages of the degrees of automation which have been defined by the Bundesanstalt für Straßenwesen (BASt) (German Federal Highway Research Agency) (see BASt publication "Forschung kompakt" ["Research compact"], edition November/2012) may be taken into consideration: in the case of assisted driving, the driver permanently performs the longitudinal guidance or lateral guidance, while the system performs the respective other function within certain limits. In the case of partially automated driving (PAD), the system performs the longitudinal guidance and lateral guidance for a certain time period and/or in specific situations, wherein the driver must permanently monitor the system as in the case of assisted driving. In the case of highly automated driving (HAD), the system performs the longitudinal guidance and lateral guidance for a certain time period without the driver having to permanently monitor the system; the driver must however be capable of taking over the control of the vehicle within a certain time. In the case of fully automated driving (FAD), the system can, for a specific usage case, handle the driving task automatically in all situations; for this usage case, there is no longer a need for a driver. The above-stated four degrees of automation according to the definition by the BASt correspond to the SAE levels 1 to 4 of the SAE J3016 standard (SAE—Society of Automotive Engineering). For example, highly automated driving (HAD) according to the BASt corresponds to level 3 of the SAE J3016 standard. Furthermore, in SAE J3016, the SAE level 5 is also provided as a highest degree of automation, which is not included in the definition by the BASt. The SAE level 5 corresponds to driverless driving, in the case of which the system can, during the entire journey, handle all situations automatically in the manner of a human driver; a driver is generally no longer necessary.

The at least one variable which represents the degree of automation may (furthermore) represent different aspects of the degree of automation. For example, various qualitative and/or quantitative variables of the degree of automation may expediently be taken into consideration. In particular, this concerns aspects of the automation which can be activated or operated at least partially independently of one another. For example, the variable which represents the degree of automation may relate to:

longitudinal guidance of the vehicle and/or
lateral guidance of the vehicle and/or
implementability of a lane change and/or
implementability of an overtaking maneuver and/or
implementability of entry onto a freeway
implementability of exiting a freeway
implementability of an automated turn maneuver, etc.

A variable which represents the degree of automation may also relate for example to a driving maneuver (which is initially possible, or which is possibly desired or expedient) or a particular, possibly impending driving maneuver.

According to a further example, the features of the device or of the operating method are applied to an at least partially automated parking, unparking and maneuvering of the vehicle. Here, features of the method, for example one or more threshold values, for example comparative patterns of the levels of the haptic contact, may be varied in relation to driving at a much higher speed.

As a further example, a device according to the invention, composed of a steering handle and an associated electronic control unit, may or may not have a mechanical coupling of the actuating element to the wheel setting angle actuator. For example, this may also be configured on the basis of a so-called drive-by-wire system. In this example, a mechanical coupling may be eliminated at least partially, in particular aside from particular position limits and/or acting force, during the influence on the movement of the vehicle or even before the influence on the movement of the vehicle.

For example, a coupling of one or more wheels of the vehicle and of the actuating element may have a first angle tolerance range which makes it possible for the position of the one or more wheels to be varied in a particular angle range and/or to a particular extent and/or up to a parameter of the lateral force acting on the one or more wheels, at least partially independently of the actuating element. Here, the first angle tolerance range may differ from an angle tolerance range which applies analogously for the actuating element, in particular the steering wheel (as steering handle). In this example, the first angle tolerance range and/or the second angle tolerance range may be in particular (dynamically) controlled in a manner dependent on the level of the haptic contact and/or in a manner dependent on the variable which represents the degree of automation.

Possible advantages that arise with the present invention are listed below: The user or driver of the vehicle is provided with a new, highly attractive function during partially automated or automated driving. This gives rise to a new driving experience. This may differ significantly from a substantially manual, assisted or highly automated operating mode of the vehicle.

Here, a demand of the vehicle user for natural, at least subjective, control is also satisfied. Depending on the variant or settings, features described here are also suitable as an equivalent in relation to highly automated driving for user groups who actually wish to drive themselves and should be guided toward highly automated or fully automated driving. Here, it is possible to resolve the conflict between an arbitrary, possibly spontaneous demand of the user and automated control of the vehicle during driving and during parking. That is to say, the driver retains that which they fear to lose:—their freedom of choice, and this is the case even without interruption of automated driving. As in the case of highly automated driving, the driver is generally offered better availability of time, and less attentiveness is demanded of them.

For example, the driver can decide to turn off at the next possible turning of the road, and specifies this by means of a relaxed rotation of the (decoupled) steering wheel. The driver can thereafter direct their attention to other things, while the vehicle or the device according to the invention suitably implements this specification a short time later. Therefore, the first operating mode according to the invention also leads to an increase in convenience. Furthermore, a commodity which is of importance to modern persons, specifically time, can be saved. Ideally, not only can the time for the initiation of a particular movement of the vehicle be selected freely to a certain extent, but also, a typically relatively long time before and during an implementation of a driving maneuver, in which a driver (if they wished to drive at least partially manually) has hitherto had to observe the traffic, can be saved.

What is claimed is:

1. A device for operating a vehicle which is drivable in at least partially automated fashion, having a steering handle which is actuatable by a driver, which device is also equipped to implement a substantially manual driving mode for control of at least the lateral guidance of the vehicle, wherein
   the device has at least one first operating mode which differs from a substantially manual operating mode in that one or more actuating actions imparted by the driver at the steering handle in a first time interval are implemented at least 1 second after an occurrence of the one or more actuating actions, and in a manner dependent on a predetermined condition, are implemented in a second time interval.

2. The device according to claim 1, wherein
the second time interval is selectable in a manner dependent on the at least one predetermined condition.

3. The device according to claim 1, wherein
the second time interval is selectable in a manner dependent on a level of haptic contact with at least one part of the steering handle.

4. The device according to claim 3, wherein
the device is configured to select at least one of:
(i) a second time interval occurs at least 2 seconds after an end of the first time interval if the level of the haptic contact is below a first threshold value and/or is decreasing, and
(ii) a second time interval which overlaps at least partially with the first time interval, or which occurs 2 seconds or less after the end of the first time interval, if the level of the haptic contact is above a second threshold value and/or is increasing.

5. The device according to claim 3, wherein
the level of the haptic contact between the driver and the steering handle comprises a pattern of the haptic contact on the basis of pressure exerted on the steering handle by at least one hand of the driver.

6. The device according to claim 3, wherein
the level of the haptic contact between the driver and the steering handle comprises a pattern of the haptic contact on the basis of an areal pattern of capacitively detected measured values.

7. The device according to claim 1, wherein
the predetermined condition is ascertained and taken into consideration in a manner dependent on an item of map information.

8. The device according to claim 1, wherein
the first operating mode is activatable in a manner dependent on a variable which represents a degree of driving automation.

9. The device according to claim 1, wherein
the first operating mode is initiable, deactivatable or variable in a manner dependent on a level of the haptic contact of the driver of the vehicle with a grip surface of the steering handle.

10. The device according to claim 1, wherein
a degree of interpretation of at least one actuating action imparted by the driver in a first time interval is variable in at least two stages or in continuous or quasi-continuous fashion in a manner dependent on the level of the haptic contact.

11. The device according to claim 1, wherein
a degree of coupling of at least a second part of the steering handle to a fixed position in a coordinate system of the vehicle is controlled or definable, and
the second part differs from the first part of the steering handle.

12. The device according to claim 1, wherein
an influence on at least the lateral guidance of the vehicle in the second time interval, which is dependent on the actuating action of the driver in the first time interval, is dependent on one or more parameters of the driver.

13. The device according to claim 1, wherein
a variation of a degree of interpretation of the one or more actuating actions imparted by the driver in a first time interval, and/or of a coupling of the steering handle or of a part thereof, is dependent on an action, which overshoots a predetermined level, by the driver on another actuating unit for control of the vehicle.

14. The device according to claim 13, wherein
the device is designed to identify a takeover desire and/or a steering capability of the driver with regard to a driving task and to control the degree of the interpretation of the one or more actuating actions imparted by the driver in a first time interval, and/or of the coupling of at least one part of the steering handle, in a manner dependent on the identified level of the takeover desire and/or of the takeover capability.

15. The device according to claim 13, wherein
the device is designed to ascertain a presently executed automatic maneuver or predicted at least partially performed maneuver, and to thereupon apply different levels of haptic contact as prerequisite for a variation of the degree of the interpretation of the one or more actuating actions imparted by the driver in a first time interval and/or of the coupling.

16. The device according to claim 1, wherein
the device is designed to output at least one item of haptic information to at least one part of the steering handle, which item of haptic information confirms a receipt or a taking into consideration of an actuating action imparted by the driver in a first time interval.

17. An operating method for operating a vehicle which is drivable in at least partially automated fashion, having a steering handle which can be actuated by a driver of the vehicle and which, in a substantially manual operating mode, serves for control at least of lateral guidance of the vehicle, wherein
at least one first operating mode is initiated or implemented, wherein, in the first operating mode, the steering handle is at least partially decoupled from an influence on the lateral guidance of the vehicle, and wherein an actuating action by the driver in a first time interval is identified, which actuating action characterizes a specification for a variation at least of the lateral guidance of the vehicle, and wherein, in a second time interval beginning at least 1 second following the identification of the actuating action, at least one movement of the vehicle is implemented as a consequence of the identified actuating action, wherein the second time interval does not coincide with the first time interval.

18. A computer program product comprising a non-transitory computer readable medium having stored thereon program code which, when executed on a processing unit, carries out a method for operating a vehicle which is drivable in at least partially automated fashion, the vehicle having a steering handle which can be actuated by a driver of the vehicle and which, in a substantially manual operating mode, serves for control at least of lateral guidance of the vehicle, wherein
at least one first operating mode is initiated or implemented, wherein, in the first operating mode, the steering handle is at least partially decoupled from an influence on the lateral guidance of the vehicle, and wherein an actuating action by the driver in a first time interval is identified, which actuating action characterizes a specification for a variation at least of the lateral guidance of the vehicle, and wherein, in a second time interval beginning at least 1 second following the identification of the actuating action, at least one movement of the vehicle is implemented as a consequence of the identified actuating action, wherein the second time interval does not coincide with the first time interval.

* * * * *